US012607884B2

(12) United States Patent
Kim et al.

(10) Patent No.: US 12,607,884 B2
(45) Date of Patent: Apr. 21, 2026

(54) TRANSPARENT ELECTROMAGNETIC TRANSMISSION STRUCTURES FOR WINDOW APPLICATIONS

(71) Applicant: 3M INNOVATIVE PROPERTIES COMPANY, St. Paul, MN (US)

(72) Inventors: Jaewon Kim, Woodbury, MN (US); Lars Schrix, Duisburg (DE); Gregory M. Haugen, Edina, MN (US); Robert A. Sainati, Bloomington, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 342 days.

(21) Appl. No.: 18/238,077

(22) Filed: Aug. 25, 2023

(65) Prior Publication Data

US 2024/0077756 A1 Mar. 7, 2024

Related U.S. Application Data

(60) Provisional application No. 63/403,004, filed on Sep. 1, 2022.

(51) Int. Cl.
*G02F 1/01* (2006.01)

(52) U.S. Cl.
CPC ................................. *G02F 1/0136* (2013.01)

(58) Field of Classification Search
CPC ......... G02F 1/0136; H01Q 1/38; H01Q 15/02
See application file for complete search history.

(56) References Cited

U.S. PATENT DOCUMENTS

| | | | |
|---|---|---|---|
| 2014/0104122 A1 | 4/2014 | Lee | |
| 2017/0250456 A1 | 8/2017 | Dai | |
| 2023/0051681 A1* | 2/2023 | Jang | .................. H01Q 5/314 |

(Continued)

FOREIGN PATENT DOCUMENTS

| | | |
|---|---|---|
| EP | 3309343 B1 | 5/2019 |
| WO | 2017064054 A1 | 4/2017 |

OTHER PUBLICATIONS

Karttunen, "Investigation of 5G Radio Frequency Signal Losses of Glazing Structures", Conference: Glass Performance Days (GPD) Finland Jun. 2019, pp. 13-19.

(Continued)

*Primary Examiner* — Mariam Qureshi
(74) *Attorney, Agent, or Firm* — Jonathan L. Tolstedt

(57) ABSTRACT

An optical construction includes optical stacks arranged across the construction and spaced apart from each other. Each of the optical stacks has a transmittance of at least 60% for at least one visible wavelength and includes one or more electrically conductive layers. The optical stacks are co-extensive with first and second antennas. Each of the electrically conductive layers defines a through opening aligned with at least one of the first and second antennas. For each of an s-polarized first incident signal incident on the optical construction in a first incident plane and a p-polarized second incident signal incident on the optical construction in a second incident plane orthogonal to the first incident plane, for at least one frequency in a range from 0.5 GHz to 10 GHz, and for incident angles of up to 40 degrees, the optical construction has a transmission coefficient of between 0 dB and −10 dB.

14 Claims, 8 Drawing Sheets

(56)  References Cited

U.S. PATENT DOCUMENTS

2023/0168359 A1*  6/2023  Rezvani ................ G01S 13/865
                                                      342/54
2023/0208027 A1*  6/2023  Wang ..................... H01Q 21/28
                                                      343/702

OTHER PUBLICATIONS

Pous, "A Frequency-Selective Surface Using Aperture-Coupled Microstrip Patches" IEEE Transactions on Antennas and Propagation, Dec. 1991, vol. 39, No. 12, pp. 1763-1769.

Pozar, "Flat lens antenna concept using aperture coupled microstrip patches", Electronics Letters, Nov. 1996, vol. 32, No. 23, pp. 2109-2111.

* cited by examiner

TRANSPARENT ELECTROMAGNETIC TRANSMISSION STRUCTURES FOR WINDOW APPLICATIONS

SUMMARY

In some aspects of the present description, an optical construction is provided, the optical construction including a plurality of optical stacks arranged two-dimensionally across the optical construction and spaced apart from each other. Each of the optical stacks has an optical transmittance of at least 60% for at least one visible wavelength in a visible wavelength range extending from about 420 nm to about 680 nm. Each of the optical stacks includes one or more electrically conductive layers disposed between, and at least substantially co-extensive in length and width with, first and second antennas. Each of the one or more electrically conductive layers defines a through opening therein disposed substantially such that it is aligned with a center of at least one of the first and second antennas. For each of an s-polarized first incident signal incident on the optical construction in a first incident plane and a p-polarized second incident signal incident on the optical construction in a second incident plane orthogonal to the first incident plane, and for at least one frequency in a frequency range extending from about 0.5 GHz to about 10 GHz, and for incident angles of at least up to about 40 degrees, the optical construction has a transmission coefficient of between about 0 dB and about −10 dB.

In some aspects of the present description, an optical construction is provided, the optical construction including a plurality of first antennas disposed on a plurality of second antennas, and one or more metal layers disposed between, and at least substantially co-extensive in length and width with, the pluralities of the first and second antennas. Each of the one or more metal layers define a plurality of through openings therein. The first antennas, the second antennas, and the through openings in each of the one or more metal layers are aligned in one-to-one correspondence with each other. For a first incident signal incident on the optical construction in a first incident plane and having a first polarization state, for frequencies in a first frequency range that is at least 0.1 GHz wide and between about 0.5 GHz and about 15 GHz, the optical construction has a transmission coefficient that is negative and has a magnitude of less than about 2 dB for a first incident angle of less than about 10 degrees, and a transmission coefficient S21 that is negative and has a magnitude of less than about 10 dB for a second incident angle of greater than about 20 degrees.

In some aspects of the present description, an optical construction is provided, the optical construction including a plurality of electrically conductive first coupling elements disposed on, and aligned in one-to-one correspondence with, a plurality of electrically conductive second coupling elements and one or more metallic layers. Each of the first and second coupling elements have a sheet resistance of less than about 10 ohms per square. The one or more metallic layers are disposed between, and at least substantially co-extensive in length and width with, the pluralities of the first and second coupling elements. The corresponding first and second coupling elements are electromagnetically coupled to each other so that for a first incident signal incident on the optical construction in a first incident plane and having a first polarization state, plots of a transmission coefficient S21 of the optical construction versus frequency for a first incident angle of less than about 10 degrees and a second incident angle of greater than about 20 degrees, include respective first and second global peaks having respective first and second S21 peak values at corresponding respective first and second peak frequencies. The first and second peak frequencies are within 1 GHz of each other, and magnitudes of the first and second S21 peak values are within 1 dB of each other.

In some aspects of the present description, an optical construction is provided, the optical construction including a plurality of alternating dielectric and metal layers. Each of the dielectric and metal layers has an average thickness of less than about 500 nm, and each of the metal layers has a two-dimensional array of spaced apart through openings in an otherwise continuous metal layer. The through openings have closed perimeters. The optical construction has an optical reflectance of greater than about 40% for at least one infrared wavelength in an infrared wavelength range extending from about 800 nm to about 2000 nm. For a first incident signal incident on the optical construction in first, second, and third incident planes with the three incident planes substantially orthogonal to the optical construction and the second incident plane substantially orthogonal to the first incident plane and the third incident plane making an angle of between about 20 degrees and 70 degrees, and for a same polarization state, and for at least one frequency in a first frequency range that is at least 0.1 GHz wide and lies inside about 0.5-15 GHz, changing an incident angle of the first incident signal from a first incident angle of less than about 10 degrees to a second incident angle of greater than about 20 degrees, changes magnitudes of the respective transmission coefficients of the optical construction by less than 2 dB.

In some aspects of the present description, an optical construction is provided, the optical construction including a plurality of alternating dielectric and metal layers. Each of the dielectric and metal layers has an average thickness of less than about 500 nm, and each of the metal layers has a two-dimensional array of spaced apart through openings in an otherwise continuous metal layer. The through openings have closed perimeters. Each of the metal layers has a plurality of through openings. The through openings of each of the metal layers are substantially aligned, and in one-to-one correspondence with, the through openings of the other metal layers. Each group of aligned through openings of the metal layers is disposed between first and second metal patches to form a plurality of spaced apart coupling structures. In a first frequency range that is at least 0.1 GHz wide and lies inside about 0.5-15 GHz, for at least one polarization state, and for each of a first incident angle of less than about 10 degrees and a second incident angle of greater than about 20 degrees, a plot of a transmission coefficient S21 of the comparative optical construction is substantially flat so that a magnitude of a ratio of an average to a standard deviation of the S21 of the comparative optical construction is greater than about 500, and a plot of a transmission coefficient S21 of the optical construction comprises two spaced apart peaks, each of the two peaks having a magnitude that is less than a magnitude of the average of the S21 of the comparative optical construction by at least 5 dB.

DETAILED DESCRIPTION

Figures 1A, 1B:
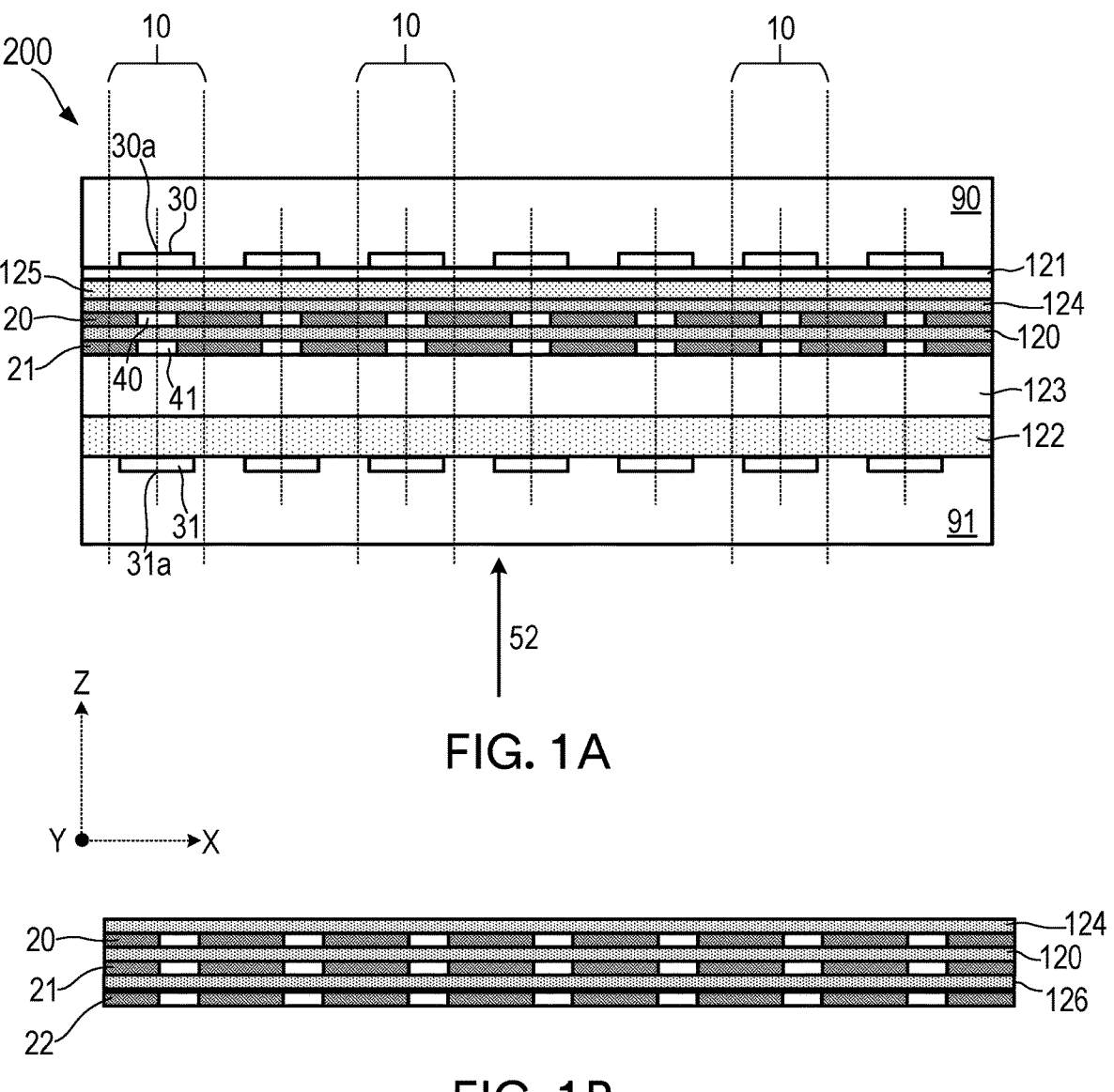
FIGS. 1A and 1B provide side views of an optical construction featuring electromagnetic wave transmission structures, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

As the importance of broadband access during commuting and traveling continues to rise, railway operators and train builders are investigating measures to ensure broadband access in a variety of trains, from suburban local trains to high-speed trains. Traditionally, railway operators have installed active repeater systems that either repeated and conditioned the received signal or converted the received signal to a local Wi-Fi installation on the train. There are a number of disadvantages to this approach. For one, a train has a lifecycle of over 20 years while an active repeater or Wi-Fi system undergoes much shorter lifecycles and requires continuous upgrading and servicing during the train's lifecycle.

For active repeaters that "stay" in the system (i.e., do convert an external signal to a signal that is distributed to a train-integrated antenna system), the railway operators must become mobile network operators requiring a license to operate on these frequencies. Additionally, the frequencies used in the local train network must not interfere with the frequencies that are used around the tracks where the train is commuting. This is a significant coordination effort for the train, as well as for network operators.

Another critical issue with wireless broadband communication on trains is finding an appropriate location for the required antennas. Due to the structure gauge of a train, the space where antennas can be installed is regulated. These antennas are often installed on the roof of a train where space is already very limited.

Because of the aforementioned limitations, operators and train builders have adopted the concept of making the train as transparent for radio-waves as possible so that active repeater systems become unnecessary. As trains are mainly built from metallic structures where radio-waves cannot pass through, the windows of a train provide the only real path for radio-waves into the train. For comfort reasons, train windows are a sandwich construction of laminated glass or tempered glass with an inner layer of tempered glass. Additionally, a low-emissivity coating is typically applied to the inside of the outer glass layer to ensure better thermal insulation.

The metallization of the glass increases the attenuation for mobile communication signals significantly. One existing way to reduce this high attenuation is to introduce a frequency selective pattern that is "etched" into the low-emissivity coating of a train window. Railway operators have reported that this technology works well for radio signals that have a perpendicular incident direction to the train window, but for larger angles of incidence, the attenuation for some polarizations rises to unacceptable levels.

Mobile network operators are currently working with railway operators to increase the capacity of a mobile network at high-speed tracks by adding dedicated trackside cells. These trackside cells have a 180° coverage instead of a 360° coverage of a "typical" rural cell and are located in proximity of the tracks to eliminate free-space loss (e.g., attenuation of signals traveling through open air) as much as possible. This cell solution will lead to an increasing importance to solving the "large angle of incidence" problem as the average angle of incidence will be higher the closer the cell is to the train.

According to some aspects of the present description, an optical construction utilizing slot-fed patch antennas on building or vehicle windows allows selective transmission of certain frequency bands through the windows. The patterning of slot-fed patch antenna structures onto the windows allows a significant improvement in through-window signal transmission.

According to some aspects of the present description, an optical construction includes a plurality of optical stacks arranged two-dimensionally (e.g., in an xy-plane of the construction) across the optical construction and spaced apart from each other. In some embodiments, each of the optical stacks may have an optical transmittance of at least 60%, or at least 70%, or at least 80%, or least 90% for at least one visible wavelength in a visible wavelength range extending from about 420 nm to about 680 nm. In some embodiments, the optical stacks may include one or more electrically conductive layers disposed between, and at least substantially co-extensive in length (e.g., an x-axis of the construction) and width (e.g., a y-axis) with, the first and second antennas. In some embodiments, each of the one or more electrically conductive layers may define a through opening therein disposed substantially aligned with a center of at least one of the first and second antennas. In some embodiments, the antennas may be passive, unpowered, repeater antennas.

In some embodiments, for each of an s-polarized first incident signal incident on the optical construction in a first incident plane and a p-polarized second incident signal incident on the optical construction in a second incident plane orthogonal to the first incident plane, for at least one frequency in a frequency range extending from about 0.5 GHz to about 10 GHz, and for incident angles of at least up to about 40 degrees, or up to about 45 degrees, or up to about 50 degrees, or up to about 55 degrees, or up to about 60 degrees, or up to about 65 degrees, or up to about 70 degrees, or up to about 75 degrees, the optical construction may have a transmission coefficient S21 of between about 0 dB and about −10 dB, or about −8 dB, or about −6 dB, or about −4 dB, or about −2 dB, or about −1.5 dB.

In some embodiments, for each of the optical stacks, the through opening in each of the one or more electrically conductive layers is elongated along a first direction (e.g., an x-axis) parallel to the first incident plane. In some such embodiments, the through opening may have a length L1 along the first direction and a width W1 along an in-plane orthogonal second direction, such that L1/W1 is greater than or equal to about 1.5, or about 2, or about 3, or about 4, or about 5. In some embodiments, a largest lateral dimension (e.g., the L1 dimension) of the through opening may be greater than about 1 mm. In some embodiments, the largest lateral dimension (e.g., the L1 dimension) of the through opening may be along a first direction (e.g., the x-axis), wherein a largest lateral dimension (e.g., the W1 dimension) of the through opening along an orthogonal lateral second direction (e.g., the y-axis) may be less than about 20 mm. In some embodiments, the through opening may have a rectangular shape. In some embodiments, the through opening may be a cross-shape opening having a first arm extending along a first direction (e.g., the x-axis) and an orthogonal second arm substantially bisecting the first arm and extending along an orthogonal second direction (e.g., the y-axis).

In some embodiments, the plurality of optical stacks may be disposed between, and bonded to, first and second substrates. In some such embodiments, at least one of the first and second substrates is glass.

In some embodiments, each of the one or more electrically conductive layers of each of the optical stacks may extend continuously in length (e.g., along an x-axis) and width (e.g., an orthogonal y-axis) beyond the first and second antennas of the optical stack and may be substantially co-extensive in length and width with the optical construction.

In some embodiments, the one or more electrically conductive layers may include first and second electrically conductive layers defining respective first and second through openings therein substantially aligned with each other. In some such embodiments, a first metal oxide layer may be disposed between the first and second electrically conductive layers. In some such embodiments, an average thickness of the first metal oxide layer may be less than about 200 nm, or less than about 150 nm, or less than about 100 nm, or less than about 90 nm, or less than about 80 nm, or less than about 60 nm, or less than about 50 nm, or less than about 40 nm, or less than about 30 nm, or less than about 20 nm, or less than about 10 nm. In some embodiments, the one or more electrically conductive layers may include at least three electrically conductive layers separated from each other by metal oxide layers.

According to some aspects of the present description, an optical construction includes a plurality of first antennas disposed on a plurality of second antennas, and one or more metal layers disposed between, and at least substantially co-extensive in length (e.g., an x-axis) and width (e.g., a y-axis) with, the pluralities of the first and second antennas. In some embodiments, each of the one or more metal layers may define a plurality of through openings therein. In some embodiments, the first antennas, the second antennas, and the through openings in each of the one or more metal layers may be aligned in a one-to-one correspondence with each other.

In some embodiments, for a first incident signal incident on the optical construction in a first incident plane and having a first polarization state (e.g., an s-polarization type), for frequencies in a first frequency range that is at least 0.1 GHz, or at least 0.12 GHz, or at least 0.14 GHz, or at least 0.16 GHz, or at least 0.18 GHz, or at least 0.19 GHz, or at least 0.2 GHz, or at least 0.21 GHz, or at least 0.22 GHz wide and is between about 0.5 GHz and about 15 GHz, the optical construction may have a transmission coefficient S21 that is negative and has a magnitude of less than about 2 dB, or 1.5 dB, or 1 dB, or 0.5 dB for a first incident angle, θ1, of less than about 10 degrees, or about 8 degrees, or about 6 degrees, or about 4 degrees, or about 2 degrees, or about 1 degree, and a transmission coefficient S21 that is negative and has a magnitude of less than about 10 dB, or 9 dB, or 8 dB, or 7 dB, or 6 dB for a second incident angle, θ1, of greater than about 20 degrees, or about 25 degrees, or about 30 degrees, or about 35 degrees, or about 40 degrees, or about 45 degrees, or about 50 degrees, or about 55 degrees, or about 60 degrees.

In some embodiments, for a second incident signal incident on the optical construction in a second incident plane orthogonal to the first incident plane and having an orthogonal second polarization state (e.g., a p-polarization type), and for frequencies in the first frequency range, the optical construction may have a transmission coefficient S21 that is negative and has a magnitude of greater than about 5 dB, or about 6 dB, or about 7 dB, or about 8 dB, or about 9 dB, or about 10 dB, or about 11 dB, or about 12 dB for the first incident angle.

In some embodiments, the first antennas are formed on a first substrate, and the second antennas are formed on a second substrate. In some such embodiments, the optical construction may further include a thermoplastic layer disposed between the one or more metal layers and the second substrate. In some embodiments, the optical construction may further include a metal oxide layer disposed between the one or more metal layers and at least one of the plurality of first antennas and the plurality of second antennas. In some embodiments, the optical construction may further include a bonding layer disposed between, and bonding to each other, the one or more metal layers and at least one of the plurality of first antennas and the plurality of second antennas.

In some embodiments, the one or more metal layers may include one or more of silver, gold, and aluminum. In some embodiments, the average thickness of each of the one or more metal layers may be less than about 100 nm, or less than about 90 nm, or less than about 80 nm, or less than about 60 nm, or less than about 50 nm. In some embodiments, the average thickness of each of the one or more metal layers may be greater than about 5 nm, or about 10 nm, or about 15 nm.

In some embodiments, at least some of the first and second antennas may include physically continuous metal layers. In some such embodiments, the physically continuous metal layers may have a sheet resistance of less than about 10, or less than about 5, or less than about 1, or less than about 0.5, or less than about 0.1, or less than about 0.05, or less than about 0.02, or less than about 0.01 ohms per square. In some embodiments, at least some of the first and second antennas may include one or more of silver, copper, aluminum, and gold.

According to some aspects of the present description, an optical construction includes a plurality of electrically conductive first coupling elements and one or more metallic layers. In some embodiments, the plurality of electrically conductive first coupling elements may be disposed on, and aligned in one-to-one correspondence with, a plurality of electrically conductive second coupling elements. In some embodiments, each of the first and second coupling elements may have a sheet resistance of less than about 10, or less than about 5, or less than about 1, or less than about 0.5, or less than about 0.1, or less than about 0.05, or less than about 0.02, or less than about 0.01 ohms per square.

In some embodiments, the one or more metallic layers may be disposed between, and at least substantially co-extensive in length (e.g., an x-axis) and width (e.g., an opposing y-axis) with, the pluralities of the first and second coupling elements. In some embodiments, the corresponding first and second coupling elements may be electromagnetically coupled to each other so that for a first incident signal incident on the optical construction in a first incident plane P1, and having a first polarization state (e.g., an s-polarization type), plots of a transmission coefficient S21 of the optical construction versus frequency for a first incident angle of less than about 10 degrees, or less than about 8 degrees, or less than about 6 degrees, or less than about 4 degrees, or less than about 2 degrees, or less than about 1 degree and a second incident angle of greater than about 20 degrees, or greater than about 25 degrees, or greater than about 30 degrees, or greater than about 40 degrees, or greater than about 45 degrees, or greater than about 50 degrees, or greater than about 55 degrees, or greater than about 60 degrees, have respective first and second global peaks having respective first and second S21 peak values at corresponding respective first and second peak frequencies. In some embodiments, the first and second peak frequencies may be within 1 GHz, or within 0.8 GHz, or within 0.6 GHz, or within 0.4 GHz, or within 0.2 GHz, or within 0.1 GHz, or within 0.08 GHz, or within 0.06 GHz, or within 0.04 GHz, or within 0.02 GHz of each other, and magnitudes of the first and second S21 peak values may be within 1 dB, or within 0.8 dB, or within 0.6 dB, or within 0.4 dB, or within 0.2 dB, or within 0.1 dB of each other.

According to some aspects of the present description, an optical construction may include a plurality of alternating dielectric and metal layers. In some embodiments, each of the dielectric and metal layers may have an average thickness of less than about 500 nm, or less than about 450 nm, or less than about 400 nm, or less than about 350 nm, or less than about 300 nm, or less than about 250 nm, or less than about 200 nm, or less than about 150 nm, or less than about 100 nm. In some embodiments, each of the metal layers may have a two-dimensional array of spaced apart through openings (i.e., openings that extend all the way through the layer) in an otherwise continuous metal layer. In some embodiments, the through openings may have closed perimeters. In some embodiments, the optical construction may have an optical reflectance of greater than about 40%, or greater than about 45%, or greater than about 50%, or greater than about 55%, or greater than about 60%, or greater than about 65%, or greater than about 70%, or greater than about 75%, or greater than about 80% for at least one infrared wavelength in an infrared wavelength range extending from about 800 nm to about 2000 nm.

In some embodiments, for a first incident signal incident on the optical construction in first, second, and third incident planes, with the three incident planes substantially orthogonal to the optical construction and the second incident plane substantially orthogonal to the first incident plane and the third incident plane making an angle of between about 20 degrees and about 70 degrees, or between about 25 degrees to about 65 degrees, or between about 30 degrees to about 60b degrees, or between about 35 degrees to about 55 degrees, or between about 40 degrees to about 50 degrees, and for a same polarization state (e.g., s-polarized), and for at least one frequency in a first frequency range that is at least 0.1 GHz, or at least 0.15 GHz, or at least 0.2 GHz, or at least 0.25 GHz wide and which lies inside about 0.5-15 GHz, changing an incident angle of the first incident signal from a first incident angle of less than about 10, degrees or about 8 degrees, or about 6 degrees, or about 4 degrees, or about 2 degrees, or about 1 degree to a second incident angle of greater than about 20 degrees, or greater than about 25 degrees, or greater than about 30 degrees, or greater than about 40 degrees, or greater than about 45 degrees, or greater than about 50 degrees, or greater than about 55 degrees, or greater than about 60 degrees, changes magnitudes of the respective transmission coefficients of the optical construction by less than 2 dB, or less than 1.75 dB, or less than 1.5 dB, or less than 1.25 dB, or less than 1 dB, or less than 0.75 dB, or less than 0.6 dB, or less than 0.5 dB, or less than 0.4 dB.

In some embodiments, for each frequency in the first frequency range, changing the incident angle of the first incident signal from the first incident angle to the second incident angle, changes magnitudes of the respective transmission coefficients of the optical construction by less than 5 dB, or less than 4.5 dB, or less than 4 dB, or less than 3.5 dB, or less than 2 dB, or less than 1 dB, or less than 0.5 dB.

According to some aspects of the present description, an optical construction may include a plurality of alternating dielectric and metal layers. In some embodiments, each of the dielectric and metal layers may have an average thickness of less than about 500 nm, or less than about 450 nm, or less than about 400 nm, or less than about 350 nm, or less than about 300 nm, or less than about 250 nm, or less than about 200 nm, or less than about 150 nm, or less than about 100 nm. In some embodiments, each of the metal layers may have a two-dimensional array of spaced apart through openings in an otherwise continuous metal layer. In some such embodiments, the through openings may have closed perimeters. In some embodiments, the through openings of each of the metal layers may be substantially aligned, and in one-to-one correspondence, with the through openings of the other metal layers. In some embodiments, each group of aligned through openings of the metal layers may be disposed between first and second metal patches to form a plurality of spaced apart coupling structures.

In some embodiments, in a first frequency range that is at least 0.1 GHz, or at least 0.15 GHz, or at least 0.2 GHz, or at least 0.25 GHz wide, and which lies inside about 0.5-15 GHz, for at least one polarization state (e.g., a s-polarized type), and for each of a first incident angle of less than about 10 degrees, or less than about 8 degrees, or less than about 6 degrees, or less than about 4 degrees, or less than about 2 degrees, or less than about 1 degree, and a second incident angle of greater than about 20 degrees, or greater than about 25 degrees, or greater than about 30 degrees, or greater than about 40 degrees, or greater than about 45 degrees, or greater than about 50 degrees, or greater than about 55 degrees, or greater than about 60 degrees, a plot of a transmission coefficient S21 of the comparative optical construction is substantially flat so that a magnitude of a ratio of an average to a standard deviation of the S21 of the comparative optical construction is greater than about 500, or greater than about 750, or greater than about 1000, or greater than about 1250, or greater than about 1500, or greater than about 1750, or greater than about 2000, or greater than about 2250, and a plot of a transmission coefficient S21 of the optical construction includes two spaced apart peaks, each of the two peaks having a magnitude that is less than a magnitude of the average of the S21 of the comparative optical construction by at least 5 dB, or at least 6 dB, or at least 7 dB, or at least 8 dB, or at least 9 dB, or at least 10 dB, or at least 12 dB, or at least 14 dB, or at least 16 dB, or at least 18 dB.

Turning now to the figures, FIGS. 1A and 1B provide side views of an optical construction featuring electromagnetic wave transmission structures. In FIG. 1A, optical construction 200 includes a plurality of optical stacks 10 arranged two-dimensionally (i.e., in an x-y plane of the optical construction, according to the coordinate system shown in FIG. 1A) across the optical construction and spaced apart from each other.

In some embodiments, each of the optical stacks 10 includes one or more electrically conductive layers 20, 21 disposed between, and at least substantially co-extensive in length (e.g., along the x-axis) and width (e.g., along the y-axis) with, first antennas 30 and second antennas 31. In some embodiments, each of the one or more electrically conductive layers may define a through opening 40, 41 therein disposed such that they are substantially aligned with a center 30a, 31a of at least one of the first 30 and second 31 antennas.

In some embodiments, the plurality of optical stacks 10 may be disposed between, and bonded to, first substrate 90 and second substrate 91. In some embodiments, at least one of the first 90 and second 91 substrates may be glass. In some embodiments, the optical construction 200 may further include a first metal oxide layer 120 disposed between the first 20 and second 21 electrically conductive layers. In some embodiments, the average thickness of the first metal oxide layer 120 may be less than about 200 nm, or less than about 150 nm, or less than about 100 nm, or less than about 90 nm, or less than about 80 nm, or less than about 60 nm, or less than about 50 nm, or less than about 40 nm, or less than about 30 nm, or less than about 20 nm, or less than about 10 nm. In some embodiments, the one or more electrically conductive layers 20, 21 may include at least three electrically conductive layers 20, 21, 22 separated from each other by metal oxide layers 120, 124, 126, as shown in FIG. 1B. Although the example shown in FIG. 1B shows three conductive layers, additional layers may be present within the scope of the present description.

In some embodiments, the first antennas 30 may be formed on a first substrate 121, and the second antennas 31 may be formed on a second substrate 122. In some embodiments, the optical construction 200 may further include a thermoplastic layer 123 disposed between the one or more electrically conductive layers 20, 21 and the second substrate 122. In some embodiments, the one or more electrically conductive layers 20, 21 may be one or more metal layers 20, 21. In some such embodiments, the one or more metal layers 20, 21 may include one or more of silver, gold, and aluminum. In some embodiments, the average thickness of each of the one or more metal layers (the one or more electrically conductive layers) 20, 21 may be less than about 100 nm, or less than about 90 nm, or less than about 80 nm, or less than about 60 nm, or less than about 50 nm. In some embodiments, the average thickness of each of the one or more metal layers 20, 21 may be greater than about 5 nm, or greater than about 10 nm, or greater than about 15 nm.

In some embodiments, the optical construction may include a metal oxide layer (e.g., metal oxide layer 124) disposed between the one or more metal layers 20, 21 and at least one of the plurality of first antennas 30 and the plurality of second antennas 31. In some embodiments, the optical construction may further include a bonding layer 125 disposed between, and bonding to each other, the one or more metal layers 20, 21 and at least one of the plurality of first antennas 30 and the plurality of second antennas 31. In some embodiments, at least some of the first 30 and second 31 antennas may include physically continuous metal layers.

In some embodiments, each of the optical stacks 10 may have an optical transmittance of at least 60%, or at least 70%, or at least 80%, or at least 90% for at least one visible wavelength in a visible (i.e., human-visible) wavelength range extending from about 420 nm to about 680 nm.

Figures 2A, 2B:
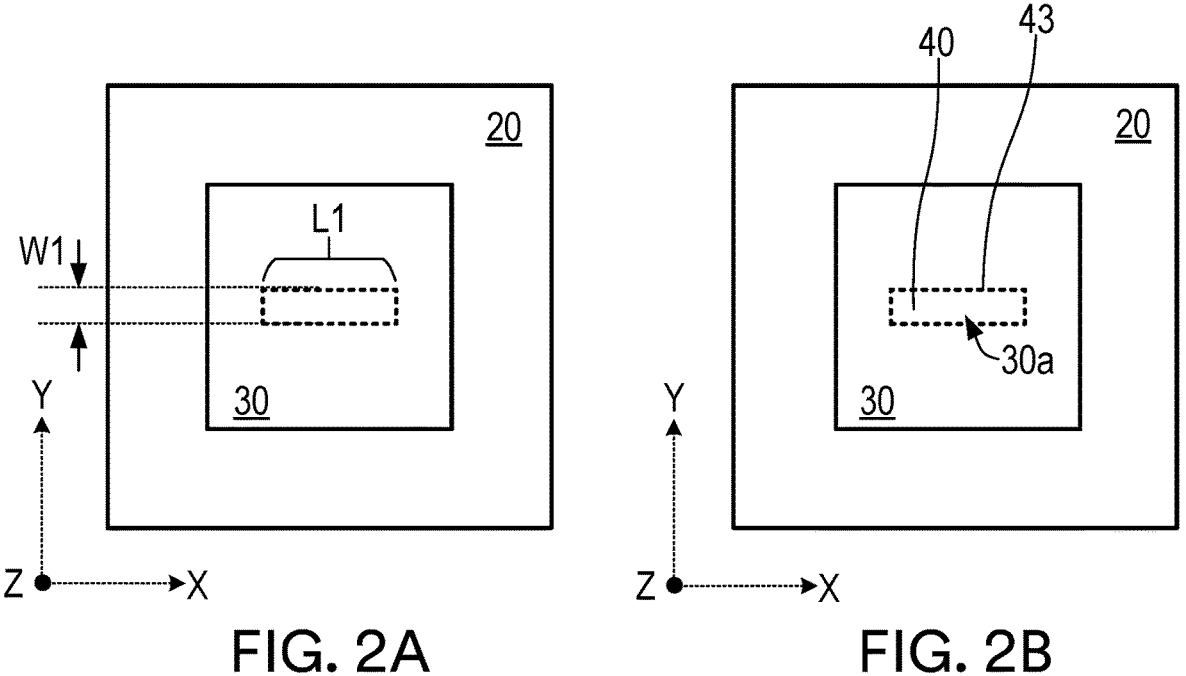
FIGS. 2A-2C provide additional details on electromagnetic wave transmission structures, in accordance with an embodiment of the present description.
Figure 2C:
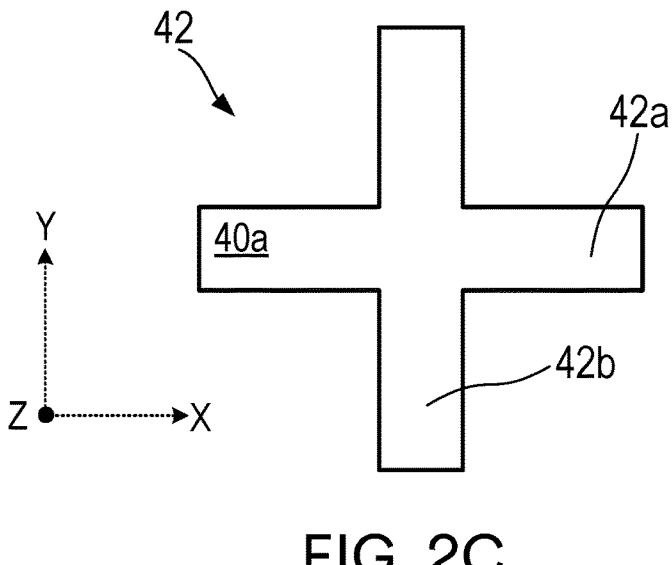

FIGS. 2A-2C provide additional details on embodiments of electromagnetic wave transmission structures according to the present description. First looking at FIGS. 2A and 2B together, a through opening 40 in electrically conductive layer 20 may be substantially centered on antenna 30 in both a length and width direction (the x-direction and y-direction, respectively, as shown in FIGS. 2A and 2B). Stated another way, through opening 40 may be substantially aligned with center 30a of antenna 30. In some embodiments, through opening 40 may have a closed perimeter 43. It should be noted that, although the examples of FIGS. 2A and 2B discuss first electrically conductive layer 20, first antenna 30, and first through opening 40, the same description may be applied to second electrically conductive layer 21, second antenna 31, and second through opening 41 (or any other similar layers/elements of an optical stack according to the present description).

Figure 3A:
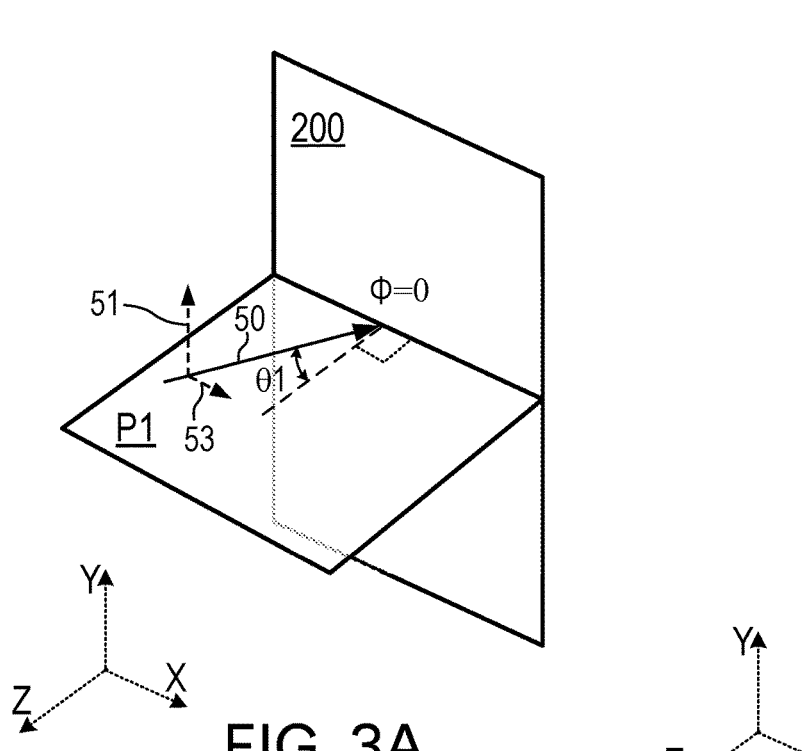
FIGS. 3A-3C define planes of incidence of signals relative to the optical construction, in accordance with an embodiment of the present description.

In some embodiments, for each of the optical stacks 10 (see FIG. 1A). the through opening 40 in electrically conductive layer 20 may be elongated along a first direction (e.g., the length direction or x-axis) parallel a first incident plane of the optical construction 200 (see FIG. 3A for definition of first incident plane P1). In some embodiments, through opening 40 may have a length L1 along the first direction and a width W1 along an in-plane orthogonal second direction, such that the ratio L1/W1 is greater than or equal to about 1.5, or about 2, or about 3, or about 4, or about 5.

In some embodiments, such as the embodiment of FIG. 2C, a through opening 40a may be a cross-shape opening 42 having a first arm 42a extending along a first direction (e.g., the x-axis shown in FIG. 2C) and an orthogonal second arm 42b substantially bisecting the first arm and extending along an orthogonal second direction (e.g., the y-axis).

Figure 3B:
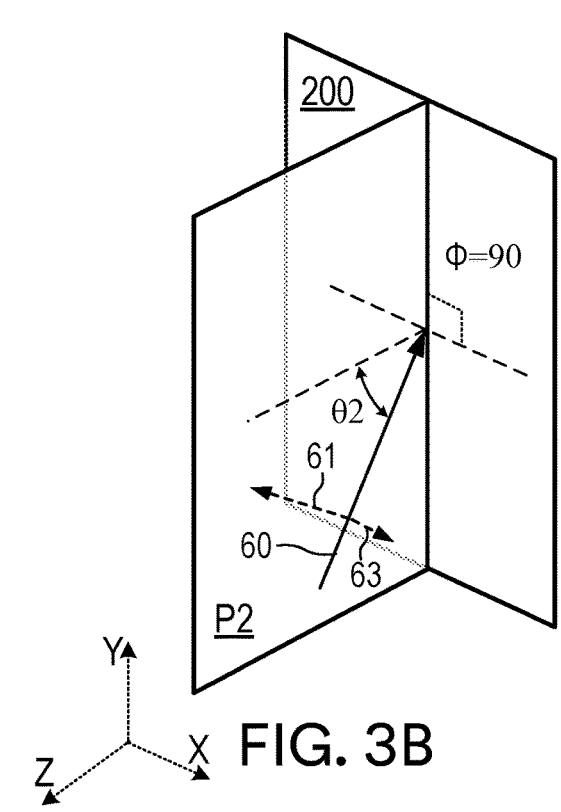
Figure 3C:
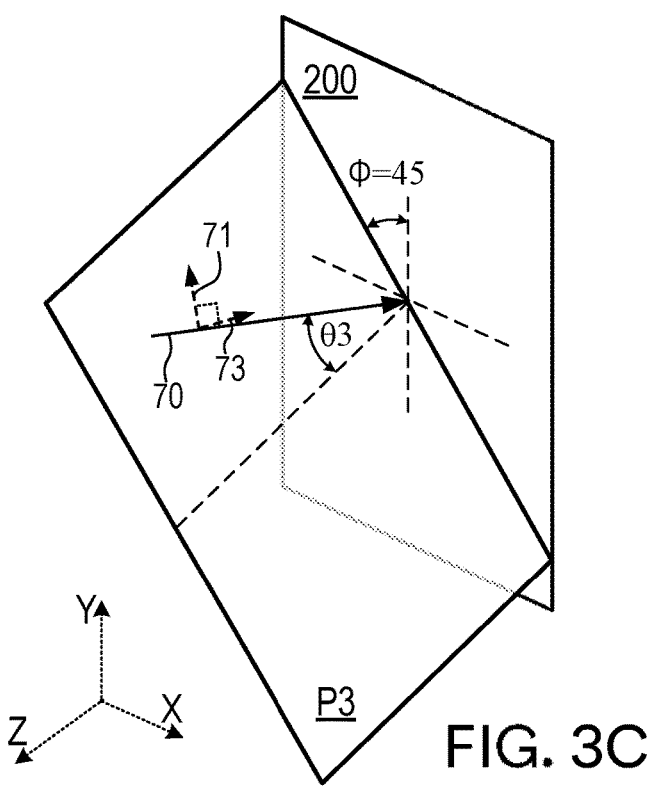

FIGS. 3A-3C define planes of incidence of signals relative to the optical construction 200 for use in the discussion of transmission coefficients as defined in FIGS. 4-5 and 7-8 herein. FIG. 3A shows a first incident signal 50 which is incident on optical construction 200 in a first incident plane P1 at a first incident angle θ1. FIG. 3B shows a second incident signal 60 which is incident on optical construction 200 in a second incident plane P2 at a second incident angle θ2. FIG. 3C shows a third incident signal 70 which is incident on optical construction 200 in a third incident plane P3 at a third incident angle θ3. In some embodiments, the first P1, second P2, and third P3 incident planes may be substantially orthogonal to optical construction 200. In some embodiments, the second incident plane P2 may be substantially orthogonal to the first incident plane P1, and the third incident plane P3 may make an angle φ of between about 20 degrees and 70 degrees, or between about 25 degrees to about 65 degrees, or between about 30 degrees to about 60b degrees, or between about 35 degrees to about 55 degrees, or between about 40 degrees to about 50 degrees with the first incident plane P1.

In some embodiments, first incident signal 50 may have an s-polarized component 51 and a p-polarized component 53 (FIG. 3A). In some embodiments, second incident signal 60 may have an s-polarized component 63 and a p-polarized component 61 (FIG. 3B). In some embodiments, third incident signal 70 may have an s-polarized component 73 and a p-polarized component 71 (FIG. 3C). The definitions provided by FIGS. 3A-3C will be used in discussions of transmission coefficients of the optical construction 200 presented herein.

Figure 4:
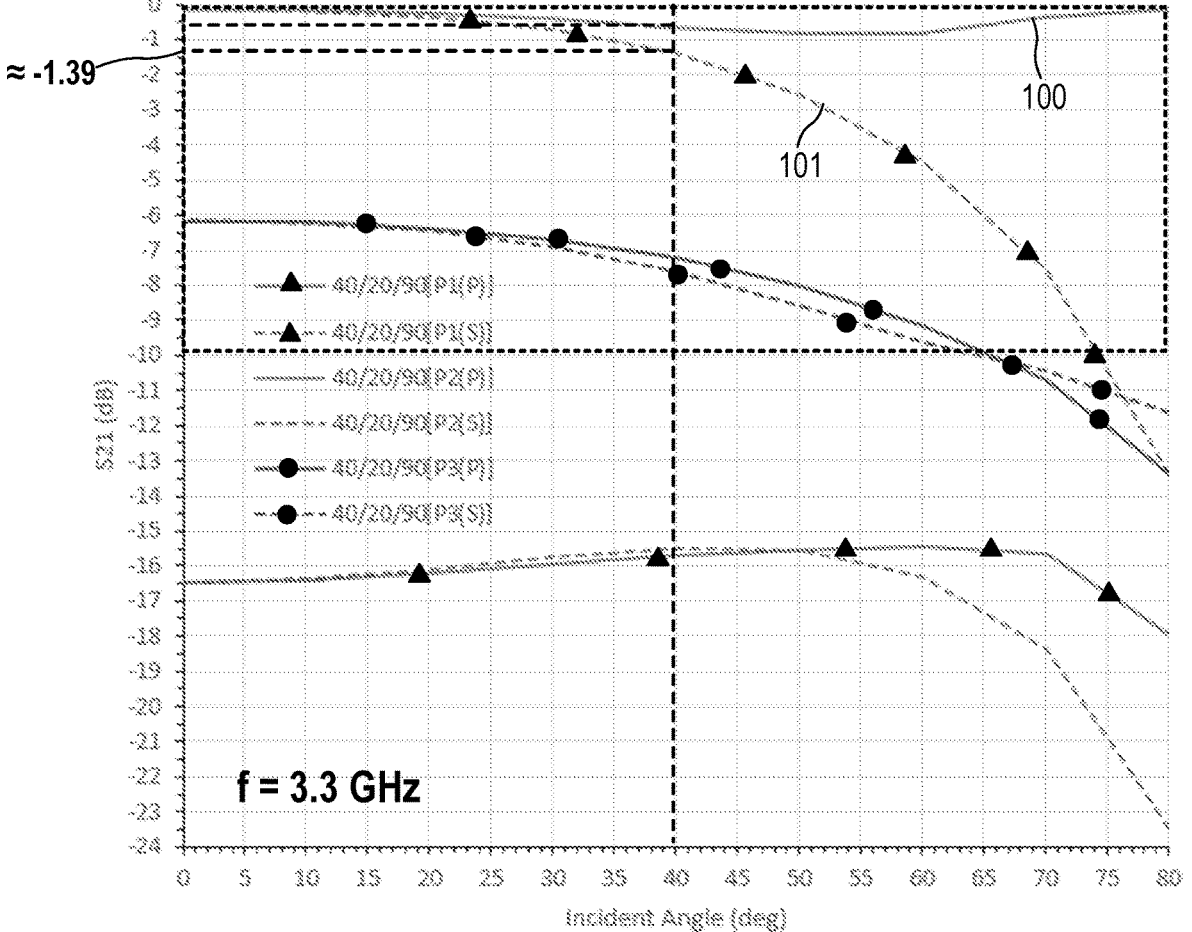
FIG. 4 provides a plot of a transmission coefficient S21 of the optical construction, in accordance with an embodiment of the present description.

FIG. 4 provides a plot of a transmission coefficient S21 of the optical construction. For the following description, references will be made back to FIGS. 3A-3C and the definitions provided therein, as well as other figures herein, such as the embodiment of the optical construction 200 of FIGS. 1A and 1B. FIG. 4 plots a transmission coefficient S21 of optical construction 200 of FIG. 1A, or a similar embodiment. FIGS. 1A, 1B, and 3A-3C will be referenced throughout the remaining description presented herein.

Each of the plotlines is presented in the key of the graph with a nomenclature of, for example:

40/20/90[P1(P)]

The first three numbers in the label refer to an optical construction including a substrate 90 (e.g., a glass substrate), a metal layer 20 (e.g., electrically conductive layer 20), and an opening 40 (e.g., opening 40 of FIG. 1A). The term in square brackets [ ] refers to the plane of incidence of the signal (e.g., the P1 plane in this example, as shown in FIG. 3A) and the polarization type of the signal (e.g., a signal of p-polarization type in this example).

In some embodiments, for each of an s-polarized 51 first incident signal 50 incident on optical construction 200 in a first incident plane P1 (see plotline 101 in FIG. 4), and a p-polarized 61 second incident signal 60 incident on optical construction 200 in a second incident plane P2 (see plotline 100), orthogonal to the first incident plane, for at least one frequency f (e.g., f=3.3 GHz in FIG. 4) in a frequency range extending from about 0.5 GHz to about 10 GHz, and for incident angles θ1, θ2 of at least up to about 40 degrees, or about 45 degrees, or about 50 degrees, or about 55 degrees, or about 60 degrees, or about 65 degrees, or about 70 degrees, or about 75 degrees, optical construction 200 may have a transmission coefficient S21 100, 101 of between about 0 dB and about –10 dB, or between about 0 dB and about –8 dB, or between about 0 dB and about –6 dB, or between about 0 dB and about –4 dB, or between about 0 dB and about –2 dB, or between about 0 dB and about –1.5 dB. For example, plotline 100 represents a plot of a p-polarized incident signal 60 (see signal 60, FIG. 3B) and plotline 101 represents a plot of an s-polarized incident signal 50 (see signal 50, FIG. 3A). Looking at plotline 100 (solid line), transmission coefficient S21 remains between 0 dB and about –1 dB for angles of incidence between 0 and 75 degrees. For plotline 101 (dashed line with triangles), transmission coefficient S21 remains between 0 dB and about –10 dB for angles of incidence between 0 and 75 degrees.

Figure 5:
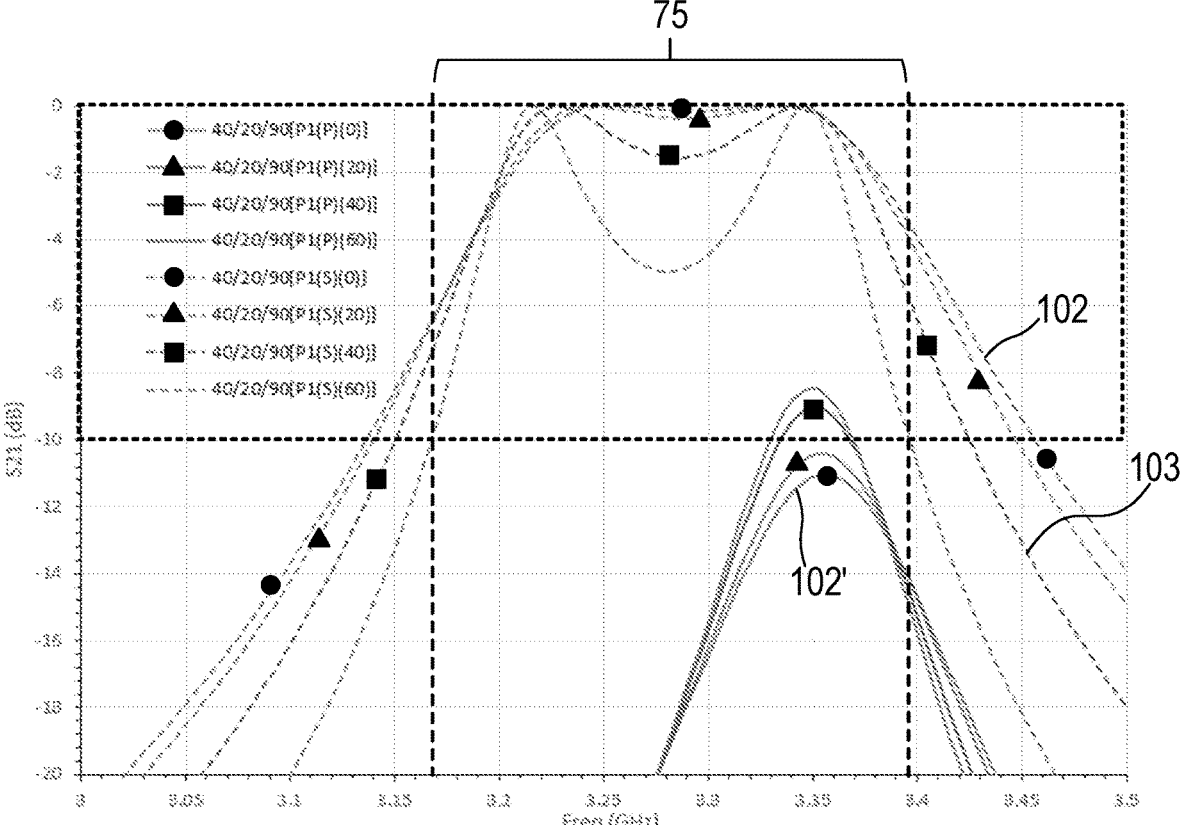
FIG. 5 is a graph showing plots of a transmission coefficient S21 for various frequencies and polarization types, in accordance with an embodiment of the present description.

FIG. 5 is a graph showing plots of a transmission coefficient S21 for various frequencies and polarization types for an embodiment of the optical construction according to the present description.

Each of the plotlines is presented in the key of the graph in FIG. 5 with a label having the following nomenclature (for example):

40/20/90[P1(P)(0)]

As with the plotline labels of FIG. 4, the first three numbers in the label refer to an optical construction including a substrate 90 (e.g., a glass substrate), a metal layer 20 (e.g., electrically conductive layer 20), and an opening 40 (e.g., opening 40 of FIG. 1A). The term in square brackets [ ] refers to the plane of incidence of the signal (e.g., the P1 plane in this example, as shown in FIG. 3A), the polarization type of the signal (e.g., a signal of p-polarization type, in this example), and the angle of incidence (e.g., an incident angle of 0 degrees, in this example).

In some embodiments, for a first incident signal 50 incident on the optical construction in a first incident plane P1 and having a first polarization state 51 (e.g., s-polarized), for frequencies in a first frequency range 75 that is at least 0.1 GHz wide, or at least 0.12 GHz wide, or at least 0.14 GHz wide, or at least 0.16 GHz wide, or at least 0.18 GHz wide, or at least 0.19 GHz wide, or at least 0.2 GHz wide, or at least 0.21 GHz wide, or at least 0.22 GHz wide (e.g., about 0.225 GHz wide, as shown in FIG. 5) and is between about 0.5 GHz and about 15 GHz, the optical construction may have a transmission coefficient S21 (see plotline 102, dashed line with circle) that is negative and has a magnitude of less than about 2 dB, or less than about 1.5 dB, or less than about 1 dB, or less than about 0.5 dB for a first incident angle θ1 (see 01 in FIG. 3A) of less than about 10 degrees, or less than about 8 degrees, or less than about 6 degrees, or less than about 4 degrees, or less than about 2 degrees, or less than about 1 degree (e.g., about 0 degrees, as shown for plotline 102), and a transmission coefficient S21 (see plotline 103, dashed line with square) that is negative and has a magnitude of less than about 10 dB, or less than about 9 dB, or less than about 8 dB, or less than about 7 dB, or less than about 6 dB for a second incident angle θ1 of greater than about 20 degrees (or greater than about 25 degrees, or greater than about 30 degrees, or greater than about 35 degrees, or greater than about 40 degrees, or greater than about 45 degrees, or greater than about 50 degrees, or greater than about 55 degrees, or greater than about 60 degrees (e.g., about 40 degrees, as shown for plotline 103).

In some embodiments, for a second incident signal 60 incident on optical construction 200 in a second incident plane P2 orthogonal to the first incident plane (see plane P2, FIG. 3B) and having an orthogonal second polarization state 61 (e.g., a p-polarization type), and for frequencies in first frequency range 75, the optical construction has a transmission coefficient S21 (see plotline 102') that is negative and has a magnitude of greater than about 5 dB, or greater than about 6 dB, or greater than about 7 dB, or greater than about 8 dB, or greater than about 9 dB, or greater than about 10 dB, or greater than about 11 dB, or greater than about 12 dB for the first incident angle (e.g., about 0 degrees).

Figure 6:
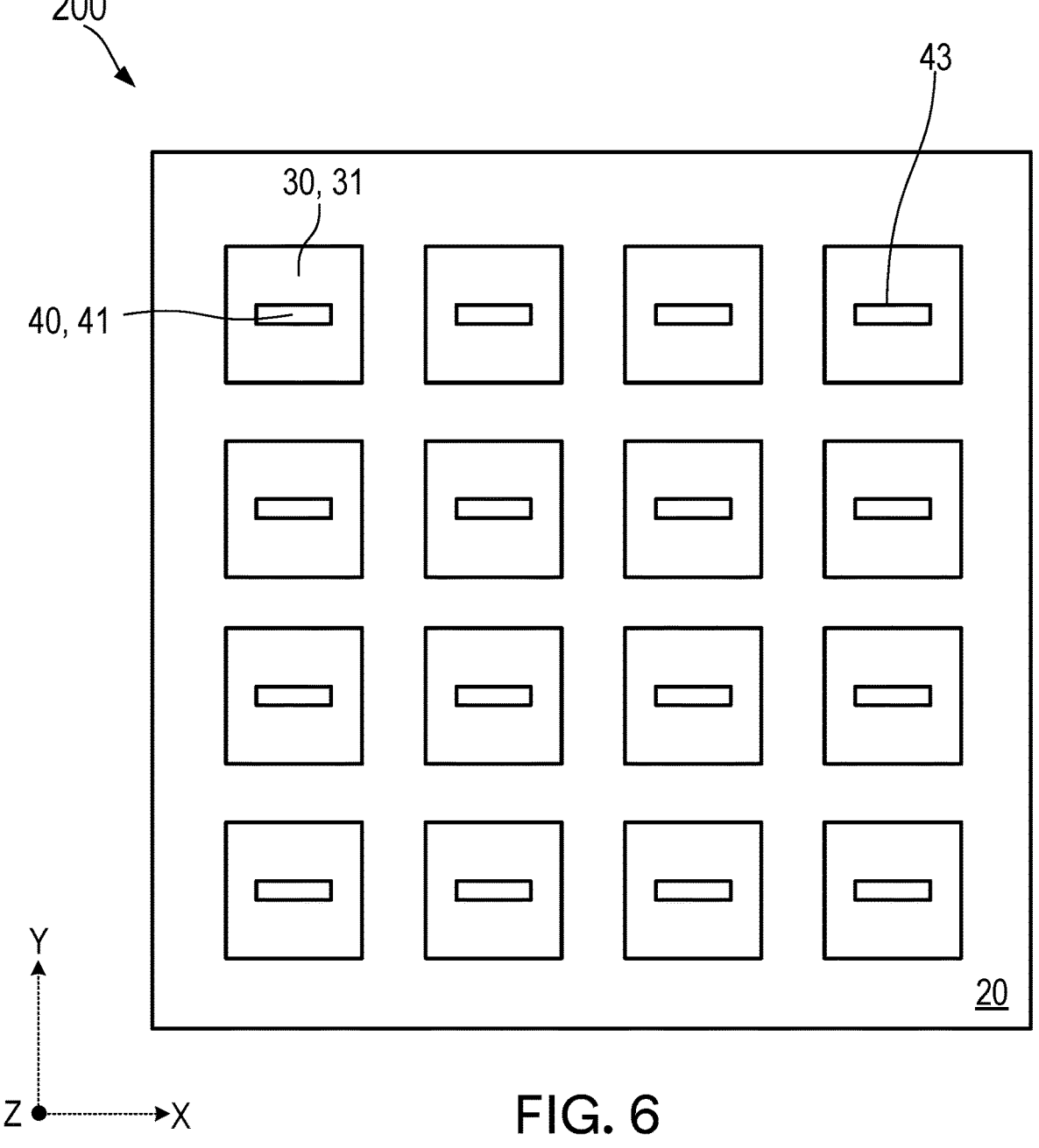
FIG. 6 shows a two-dimensional array of spaced apart electromagnetic wave transmission structures, in accordance with an embodiment of the present description.

FIG. 6 shows a two-dimensional array of spaced apart electromagnetic wave transmission structures. FIG. 6 shows the optical construction of FIG. 1A from a top, plan view. Optical construction 200 includes a plurality of alternating dielectric layers (e.g., layers 120 and 124 of FIG. 1A) and metal layers (e.g., electrically conductive layers 20 and 21 of FIG. 1A). In FIG. 6, which is seen from a top view, only metal layer 20 is visible for optical construction 200. In some embodiments, each of the dielectric layers (120, 124) and metal layers (20, 21) may have an average thickness of less than about 500 nm, or less than about 450 nm, or less than about 400 nm, or less than about 350 nm, or less than about 300 nm, or less than about 250 nm, or less than about 200 nm, or less than about 150 nm, or less than about 100 nm. In some embodiments, each of the metal layers (e.g., such as metal layer 20, shown in FIG. 6) may include a two-dimensional array of spaced apart through openings 40, 41 in an otherwise continuous metal layer. In some embodiments, through openings 40, 41 may have closed perimeters 43. In some embodiments, through openings 40, 41 may be substantially aligned with first antennas 30 and second antennas 31.

Figure 7:
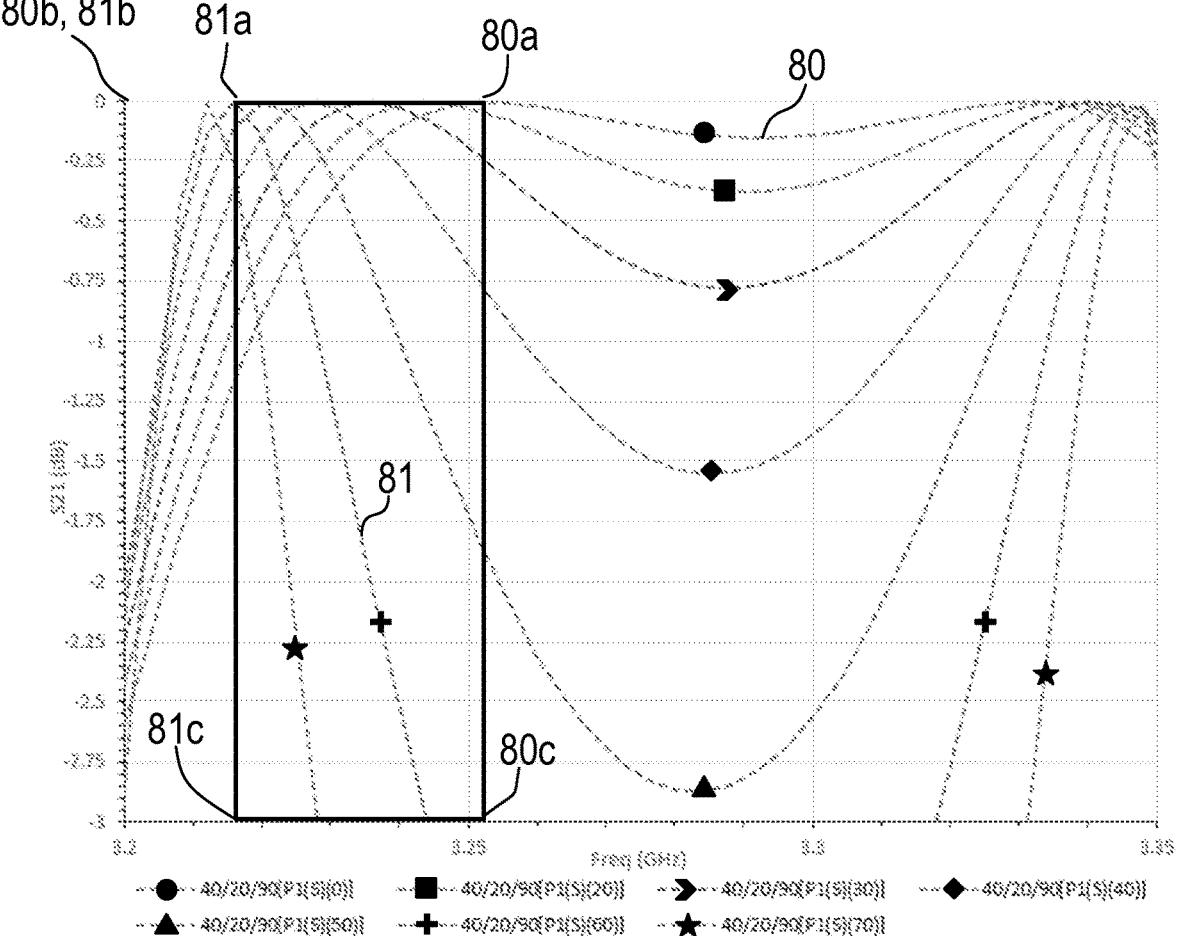
FIG. 7 provides additional plots of a transmission coefficient S21 of the optical construction, in accordance with an embodiment of the present description.

FIG. 7 provides additional plots of a transmission coefficient S21 of an optical construction, such as optical construction 200 of FIG. 1A. In such an embodiment, optical construction 200 may include a plurality of electrically conductive first coupling elements 30 (e.g., first antennae) disposed on, and aligned in one-to-one correspondence with, a plurality of electrically conductive second coupling elements 31 (e.g., second antennae). In some embodiments, each the first 30 and second 31 coupling elements may have a sheet resistance of less than about 10 ohms per square, or less than about 5 ohms per square, or less than about 1 ohms per square, or less than about 0.5 ohms per square, or less than about 0.1 ohms per square, or less than about 0.05 ohms per square, or less than about 0.02 ohms per square, or less than about 0.01 ohms per square ohms per square.

In some embodiments, optical construction 200 of FIG. 1 may further include one or more metallic layers 20, 21 disposed between, and at least substantially co-extensive in length (e.g., the x-axis of FIG. 1A) and width (e.g., y-axis) with, the pluralities of the first 30 and second 31 coupling elements. The description now turns specifically to FIG. 7, for which the plotlines are labeled in a manner consistent with the labeling of FIG. 5 elsewhere herein.

In some embodiments, the corresponding first 30 and second 31 coupling elements may be electromagnetically coupled to each other so that for a first incident signal 50 incident on optical construction 200 in a first incident plane P1 and having a first polarization state 51 (e.g., an s-polarization type), plots 80, 81 of a transmission coefficient S21 of the optical construction versus frequency for a first incident angle (e.g., θ1 of FIG. 3A) of less than about 10 degrees, or less than about 8 degrees, or less than about 6 degrees, or less than about 4 degrees, or less than about 2 degrees, or less than about 1 degree (e.g., about 0 degrees) and a second incident angle θ1 of greater than about 20, or greater than about 25, or greater than about 30, or greater than about 40, or greater than about 45, or greater than about 50, or greater than about 55, or greater than about 60 degrees (e.g., about 60 degrees), have respective first global peak 80a and second global peak 81a having respective first S21 peak value 80b (e.g., about 0 dB) and second peak value 81b (e.g., also about 0 dB) at corresponding respective first frequency 80c (e.g., about 3.252 GHz) and second peak frequency 81c (e.g., about 3.215 GHz). In some embodiments, the first 80c and second 81c peak frequencies may be within about 1 GHz, or about 0.8 GHz, or about 0.6 GHz, or about 0.4 GHz, or about 0.2 GHz, or about 0.1 GHz, or about 0.08 GHz, or about 0.06 GHz, or about 0.04 GHz, or about 0.02 GHz (e.g., about 0.037 GHz) of each other. In some embodiments, the magnitudes of the first 80b and second 81b S21 peak values may be within 1 dB, or within 0.8 dB, or within 0.6 dB, or within 0.4 dB, or within 0.2 dB, or within 0.1 dB of each other.

Figure 8:
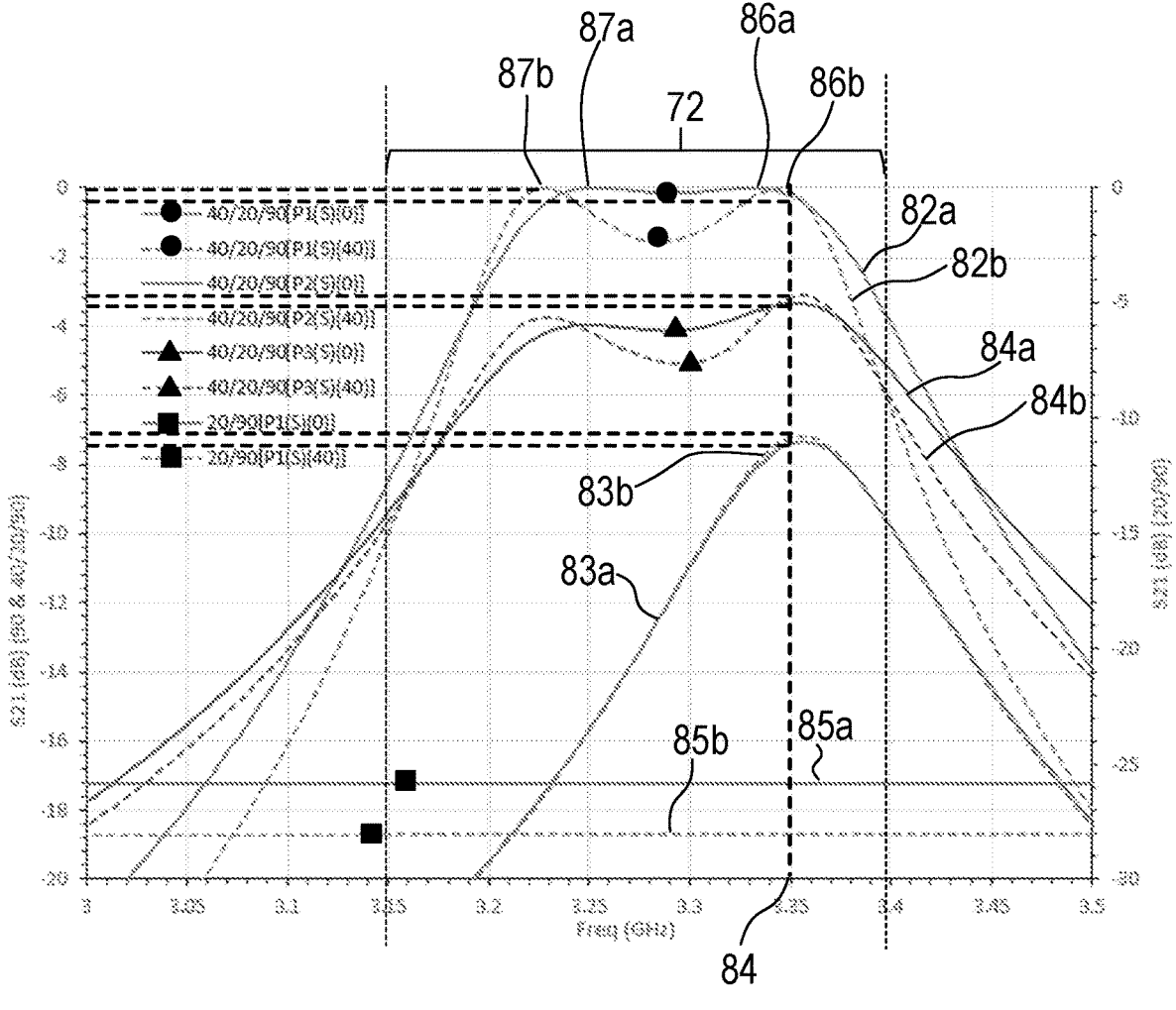
FIG. 8 provides more additional plots of a transmission coefficient S21 of the optical construction, in accordance with an embodiment of the present description.

Finally, FIG. 8 provides more additional plots of a transmission coefficient S21 of the optical construction. For the graph of FIG. 8, an optical construction (such as optical construction 200, FIG. 1A) including a plurality of alternating dielectric 120, 125 and metal layers 20, 21 is assumed. In some embodiments, for a first incident signal (e.g., signals 50, 60, 70 of FIGS. 3A-3C) incident on optical construction 200 in first P1, second P2, and third P3 incident planes with the three incident planes P1, P2, P3 substantially orthogonal to the optical construction and with the second incident plane P2 substantially orthogonal to the first incident plane P1 and the third incident plane P3 making an angle φ of between about 20 degrees and about 70 degrees, or between about 25 degrees and about 65 degrees, or between about 30 degrees and about 60b degrees, or between about 35 degrees and about 55 degrees, or between about 40 degrees and about 50 degrees, and for a same polarization state (e.g., polarization states 51, 63, 73 of FIGS. 3A-3C, representing s-polarized signals, in this example), and for at least one frequency 84 (e.g., about 3.35 GHz) in a first frequency range 72 that is at least 0.1 GHz, or at least 0.15 GHz, or at least 0.2 GHz, or at least 0.25 GHz wide and which lies inside about 0.5-15 GHz, changing an incident angle of the first incident signal from a first incident angle θ1 of less than about 10 degrees, or less than about 8 degrees, or less than about 6 degrees, or less than about 4 degrees, or less than about 2 degrees, or less than about 1 degree (e.g., about 0 degrees) to a second incident angle θ1 of greater than about 20 degrees, or greater than about 25 degrees, or greater than about 30 degrees, or greater than about 40 degrees, or greater than about 45 degrees, or greater than about 50 degrees, or greater than about 55 degrees, or greater than about 60 degrees (e.g., about 40 degrees), may change the magnitudes of the respective transmission coefficients of the optical construction 200 by less than about 2 (or less than about 1.75, or less than about 1.5, or less than about 1.25, or less than about 1, or less than about 0.75, or less than about 0.6, or less than about 0.5, or less than about 0.4 dB. That is, the difference in magnitude between plotlines 87a and 87b (the lines with circles), between plotlines 84a and 84b (the lines with triangles), and between plotlines 83a and 83b (the lines with no markers), when viewed at frequency 3.35 GHz, are shown to be less than about 0.4 dB in the example of FIG. 8 (as shown by the pairs of horizontal dashed lines in FIG. 8).

In some embodiments, for each frequency in the first frequency range 72, changing the incident angle θ1 of the first incident signal from the first incident angle to the second incident angle, may change the magnitudes of the respective transmission coefficients of the optical construction by less than about 5 dB, or less than about 4.5 dB, or less than about 4 dB, or less than about 3.5 dB, or less than about 2 dB, or less than about 1 dB, or less than about 0.5 dB. That is, for each frequency in the frequency range 72, the difference in magnitude between plotlines 87a and 87b, 84a and 84b, and 83a and 83b are shown to be less than at least about 5 dB.

In some embodiments, for the first frequency range 72 and for at least one polarization state (e.g., signal 51, s-polarized), and for each of a first incident angle θ1 of less than about 10 degrees, or less than about 8 degrees, or less than about 6 degrees, or less than about 4 degrees, or less than about 2 degrees, or less than about 1 degree and a second incident angle θ1 of greater than about 20 degrees, or greater than about 25 degrees, or greater than about 30, or greater than about 40, or greater than about 45, or greater than about 50, or greater than about 55, or greater than about 60 degrees (e.g., about 60 degrees), a plot 85a, 85b of a transmission coefficient S21 of the comparative optical construction 200 is substantially flat so that a magnitude of a ratio of an average to a standard deviation of the S21 of the comparative optical construction 200 may be greater than about 500, or greater than about 750, or greater than about 1000, or greater than about 1250, or greater than about 1500, or greater than about 1750, or greater than about 2000, or greater than about 2250, and a plot 82a, 82b of a transmission coefficient S21 of the optical construction 200 may include two spaced-apart peaks (e.g., peaks 86a, 87a; peaks 86b, 87b), where each of the two peaks has a magnitude that is less than a magnitude of the average of the S21 of the comparative optical construction by at least 5 dB, or at least 6 dB, or at least 7 dB, or at least 8 dB, or at least 9 dB, or at least 10 dB, or at least 12 dB, or at least 14 dB, or at least 16 dB, or at least 18 dB.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed:

1. An optical construction comprising a plurality of optical stacks arranged two-dimensionally across the optical construction and spaced apart from each other, each of the optical stacks having an optical transmittance of at least 60% for at least one visible wavelength in a visible wavelength range extending from about 420 nm to about 680 nm and comprising one or more electrically conductive layers disposed between, and at least substantially co-extensive in length and width with, first and second antennas, each of the one or more electrically conductive layers defining a through opening therein disposed substantially aligned with a center of at least one of the first and second antennas, such that for each of an s-polarized first incident signal incident on the optical construction in a first incident plane and a p-polarized second incident signal incident on the optical construction in a second incident plane orthogonal to the first incident plane, for at least one frequency in a frequency range extending from about 0.5 GHz to about 10 GHz, and for incident angles of at least up to about 40 degrees, the optical construction has a transmission coefficient S21 of between about 0 dB and about −10 dB.

2. The optical construction of claim 1, wherein for each of the optical stacks, the through opening in each of the one or more electrically conductive layers is elongated along a first direction (x-axis) parallel to the first incident plane.

3. The optical construction of claim 2, wherein the through opening has a length L1 along the first direction and a width W1 along an in-plane orthogonal second direction, $L1/W1 \geq 1.5$.

4. The optical construction of claim 1, wherein each of the one or more electrically conductive layers of each of the optical stacks extends continuously in length and width beyond the first and second antennas of the optical stack and is substantially co-extensive in length and width with the optical construction.

5. The optical construction of claim 1, wherein the plurality of the optical stacks is disposed between, and bonded to, first and second substrates.

6. The optical construction of claim 5, wherein at least one of the first and second substrates comprises glass.

7. The optical construction of claim 1, wherein the one or more electrically conductive layers comprise first and second electrically conductive layers defining respective first and second through openings therein substantially aligned with each other.

8. The optical construction of claim 7 further comprising a first metal oxide layer disposed between the first and second electrically conductive layers.

9. The optical construction of claim 8, wherein an average thickness of the first metal oxide layer is less than about 200 nm.

10. The optical construction of claim 1, wherein a largest lateral dimension of the through opening is greater than about 1 mm.

11. The optical construction of claim 10, wherein the largest lateral dimension of the through opening is along a first direction, wherein a largest lateral dimension of the through opening along an orthogonal lateral second direction is less than about 20 mm.

12. The optical construction of claim 1, wherein the through opening has a rectangular shape.

13. The optical construction of claim 1, wherein the through opening is a cross-shape opening having a first arm extending along a first direction and an orthogonal second arm substantially bisecting the first arm and extending along an orthogonal second direction.

14. The optical construction of claim 1, wherein the one or more electrically conductive layers comprise at least three electrically conductive layers separated from each other by metal oxide layers.

* * * * *